US012366172B1

(12) United States Patent
Kumar et al.

(10) Patent No.: US 12,366,172 B1
(45) Date of Patent: Jul. 22, 2025

(54) SEAL ASSEMBLY FOR A ROTARY MACHINE HAVING A FLEXIBLE JOINT

(71) Applicant: General Electric Company, Schenectady, NY (US)

(72) Inventors: Uttara Vijay Kumar, Rexford, NY (US); Rahul Anil Bidkar, Clifton Park, NY (US); Jonathan Russell Ratzlaff, Loveland, OH (US); Steven Douglas Johnson, Milford, OH (US); Prateek Jalan, Bengaluru (IN); Ravindra Shankar Ganiger, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/593,099

(22) Filed: Mar. 1, 2024

(51) Int. Cl.
*F01D 11/02* (2006.01)
*F01D 11/04* (2006.01)
*F01D 11/08* (2006.01)

(52) U.S. Cl.
CPC ............ *F01D 11/025* (2013.01); *F01D 11/04* (2013.01); *F01D 11/08* (2013.01); *F05D 2240/55* (2013.01)

(58) Field of Classification Search
CPC ........ F01D 11/025; F01D 11/04; F01D 11/08; F05D 2240/55
See application file for complete search history.

(56) References Cited

U.S. PATENT DOCUMENTS

| | | | | |
|---|---|---|---|---|
| 5,509,664 | A | 4/1996 | Borkiewicz | |
| 9,255,642 | B2 | 2/2016 | Bidkar et al. | |
| 10,359,117 | B2 | 7/2019 | Prenger et al. | |
| 10,626,743 | B2 | 4/2020 | Bidkar et al. | |
| 10,890,082 | B2 | 1/2021 | Hardikar et al. | |
| 10,900,369 | B2 * | 1/2021 | Gibson | F01D 11/04 |
| 10,900,570 | B2 | 1/2021 | Bidkar et al. | |
| 11,434,828 | B2 | 9/2022 | Miller et al. | |
| 11,624,290 | B2 | 4/2023 | Gibson et al. | |
| 11,624,325 | B2 | 4/2023 | Miller et al. | |
| 11,713,688 | B2 | 8/2023 | Miller et al. | |
| 12,180,840 | B1 * | 12/2024 | Bidkar | F01D 11/001 |
| 2011/0229311 | A1 * | 9/2011 | Varanasi | F16J 15/445 415/170.1 |
| 2020/0157961 | A1 * | 5/2020 | Rodriguez Erdmenger | F01D 11/001 |
| 2020/0166142 | A1 * | 5/2020 | Bidkar | F16J 15/44 |
| 2020/0166143 | A1 * | 5/2020 | Tran | F16J 15/40 |
| 2023/0279781 | A1 * | 9/2023 | Ganiger | F16J 15/4476 277/412 |
| 2023/0399957 | A1 * | 12/2023 | Hardikar | F01D 11/025 |
| 2024/0026799 | A1 * | 1/2024 | Hardikar | F01D 11/02 |

* cited by examiner

*Primary Examiner* — Eldon T Brockman
(74) *Attorney, Agent, or Firm* — Dority & Manning, P.A.

(57) ABSTRACT

A rotary machine includes a stator and a rotor configured to rotate with respect to the stator. The rotor is arranged with the stator at a rotor-stator interface and defines a rotor face. The rotary machine also includes a seal assembly at the rotor-stator interface. The seal assembly includes a seal rotor, a seal stator, a seal slider, and a seal defined by a rotor face of the seal rotor and a slider face of the seal slider. Further, the seal assembly includes a flexible joint connected between the slider face and a primary seal body of the seal slider. The flexible joint is configured to locally decouple movement of the slider face from the seal slider to allow the slider face to track movement of the rotor apart from the primary seal body.

20 Claims, 6 Drawing Sheets

SEAL ASSEMBLY FOR A ROTARY MACHINE HAVING A FLEXIBLE JOINT

FIELD

The present disclosure generally relates to rotary machines, and more particularly, to seal assemblies between components in rotary machines.

BACKGROUND

Gas turbine engines generally include a turbine section downstream of a combustion section that is rotatable with a compressor section to rotate and operate the gas turbine engine to generate power, such as propulsive thrust. Typically, the turbine section defines a high pressure turbine in serial flow arrangement with an intermediate pressure turbine and/or low pressure turbine. The high pressure turbine includes an inlet or nozzle guide vane between the combustion section and the high pressure turbine rotor. The nozzle guide vane generally serves to accelerate a flow of combustion gases exiting the combustion section to more closely match or exceed the high pressure turbine rotor speed along a tangential or circumferential direction. Thereafter, turbine sections generally include successive rows or stages of stationary and rotating airfoils, or vanes and blades, respectively.

In addition, rotary machines, such as gas turbine engines, have seals between rotating components (e.g., rotors) and corresponding stationary components (e.g., stators). These seals may help to reduce leakage of fluids between the rotors and stators. The seals may additionally or alternatively help separate fluids that have respectively different pressures and/or temperatures. The sealing properties of a seal may impact not only the amount of leakage and/or separation of fluids, but also the overall operation and/or operating efficiency of the rotary machine. An example seal in a gas turbine engine is a non-contacting film riding aspirating face seal of the rotor.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
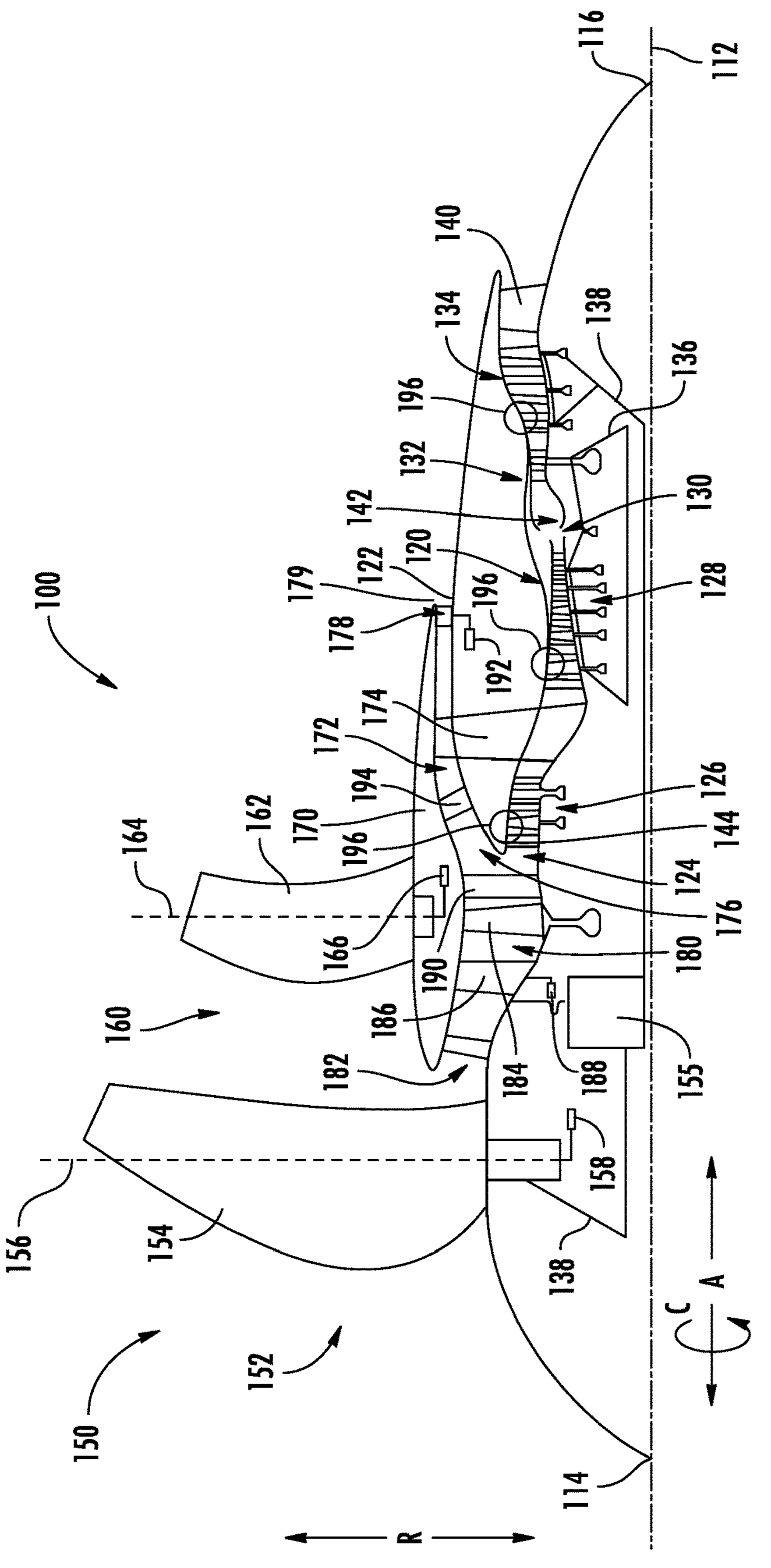
FIG. 1 shows a schematic cross-sectional view of an exemplary rotary machine that includes a gas turbine engine according to embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term “combustion section” refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term “rotor” refers to any component of a rotary machine, such as a turbine engine, that rotates about an axis of rotation. By way of example, a rotor may include a shaft or a spool of a rotary machine, such as a turbine engine.

As used herein, the term “stator” refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms “low” and “high”, or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

As used herein, the terms “axial” and “axially” refer to directions and orientations that extend substantially parallel to a centerline of the gas turbine engine. Moreover, the terms “radial” and “radially” refer to directions and orientations that extend substantially perpendicular to the centerline of the gas turbine engine. In addition, as used herein, the terms “circumferential” and “circumferentially” refer to directions and orientations that extend arcuately about the centerline of the gas turbine engine.

The terms “coupled”, “fixed”, “attached to”, and the like refer to both direct coupling, fixing, or attaching, as well as indirect coupling, fixing, or attaching through one or more intermediate components or features, unless otherwise specified herein.

As used herein, the terms “first”, “second”, “third” and so on may be used interchangeably to distinguish one component from another and are not intended to signify location or importance of the individual components.

The term “adjacent” as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms “integral”, “unitary”, or “monolithic” as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally relates to seal assemblies for rotary machines. The presently disclosed seal assemblies may be utilized in any rotary machine. Exemplary embodiments may be particularly suitable for turbomachines, such as turbine engines, and the like. The presently disclosed seal assemblies include aspirating seals that provide a thin film of fluid between a face of the seal and a face of the rotor. The thin film of fluid may be provided by a one or more aspiration conduits that allow fluid, such as pressurized air or gasses within a turbine engine to flow from a higher-pressure region on one side of the seal assembly to a lower-pressure region on another side of the seal assembly. The fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, an aerodynamic bearing, or a combination of aerostatic and aerodynamic features referred to as a hybrid bearing, or the like.

Accordingly, the presently disclosed seal assemblies are generally considered non-contacting seals, in that the fluid bearing inhibits contact between the seal face and the rotor face. The presently disclosed seal assemblies include a primary seal defined by a rotor face of a seal rotor and a slider face of a seal slider. The primary seal may be configured as an aspirating face seal, a fluid bearing, a gas bearing, or the like. In addition, or in the alternative, the primary seal may be configured as a radial film riding seal, an axial film riding seal, an axial brush seal, a radial brush seal, a radial carbon seal, an axial carbon seal, or the like.

In particular embodiments, for example, the seal assembly of the present disclosure generally includes a seal rotor, a seal stator, a seal slider, and a seal defined by a rotor face of the seal rotor and a slider face of the seal slider. Furthermore, the seal assembly includes a flexible joint connected between the slider face and a primary seal body of the seal slider to allow the slider face to track axial movement of the rotor without affecting the primary seal body, thereby decoupling movement of the slider face from the seal slider.

In conventional seal arrangements, the entire slider acts as one rigid body that tracks movement of the rotor and hence is more susceptible to rubs and damage. Further, the slider face of the seal in conventional arrangements is rigidly tied to the slider and hence not flexible enough to engage with the rotor. In contrast, the seal assembly of the present disclosure includes a flexible structure that joins the slider face to the slider body. Thus, this structure is described herein as being capable of locally decoupling movement of the slider face from the seal slider to allow the slider face to track movement of the rotor apart from the slider body. Accordingly, the flexible structure/joint described herein allows at least a portion of the slider face to deform, tilt, and/or otherwise move with the rotor separate and apart from the rest of the slider body, because, at least for small rotor axial movement (e.g., such as up to 5° coning, preferably up to 1°, more preferably up to 0.25° coning), the portion of the slider face will itself be able to track the rotor without affecting the rest of the slider body. Thus, the flexible structure/joint of the present disclosure provides improved flexibility to engage with the rotor and maintain a generally constant air gap. In certain embodiments, for improved flexibility, the slider face may also be segmented into a plurality of segments, which allows for locally decoupling movement of the slider face from the seal slider.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees) (360° around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a HP turbine 132. The HP turbine 132 drives the HP compressor 128 through a HP shaft 136. In this regard, the HP turbine 132 is drivingly coupled with the HP compressor 128. The high energy combustion products then flow to a LP turbine 134. The LP turbine 134 drives the LP compressor 126 and components of the fan section 150 through a LP shaft 138. In this regard, the LP turbine 134 is drivingly coupled with the LP compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the LP turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the LP turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending, circumferentially spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, Fn3s (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, Fn3s, during one or more engine operating conditions. Further, by introducing a variability in the geometry of the inlet guide vanes 186 and the fan exhaust nozzle 178, the engine 100 may be capable of generating more efficient third stream thrust, Fn3s, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine with the air passing through the fan duct 172, as a resource for removing heat from a fluid, e.g., compressor bleed air, oil, or fuel.

Although not depicted, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the engine 100 (e.g., lubrication oil systems, compressor bleed air, electrical components, etc.). The heat exchanger 194 uses the air passing through the fan duct 172 as a heat sink and correspondingly increases the temperature of the air downstream of the heat exchanger 194 and exiting the fan exhaust nozzle 178.

By way of example, FIG. 1 shows some exemplary locations 196 of a seal assembly. Such seal assemblies may be particularly suited, for example, at a rotor-stator interface 201 as described herein and illustrated in FIG. 2A. As an example, a seal assembly may be located at or near a bearing compartment. A seal assembly located at or near the bearing compartment may sometimes be referred to as a bearing compartment seal. Such a bearing compartment seal may be configured to inhibit air flow, such as core airflow, from passing into a bearing compartment of the engine 100, such as a bearing compartment located at an interface between the LP shaft 138 and the HP shaft 136.

As another example, a seal assembly may be located at or near the compressor section of the engine 100. In some embodiments, a seal assembly may be located at or near a compressor discharge, for example, of the HP compressor 128. A seal assembly located at or near the compressor discharge may sometimes be referred to as a compressor discharge pressure seal. Such a compressor discharge pressure seal may be configured to maintain pressure downstream of the compressor section and/or to provide bearing thrust balance. Additionally, or in the alternative, a seal assembly may be located between adjacent compressor stages of the compressor section. A seal assembly located between adjacent compressor stages may be sometimes referred to as a compressor interstage seal. Such a compressor interstage seal may be configured to limit air recirculation within the compressor section.

As another example, a seal assembly may be located at or near the turbine section of the engine 100. In some embodiments, a seal assembly may be located at or near a turbine inlet, for example, of the HP turbine 132 or the LP turbine 134. A seal assembly located at or near a turbine inlet may sometimes be referred to as a forward turbine seal. Such a forward turbine seal may be configured to contain high-pressure cooling air for the HP turbine 132 and/or the LP turbine 134, such as for turbine disks and turbine blades thereof. Additionally, or in the alternative, a seal assembly may be located at or near one or more turbine disk rims. A seal assembly located at or near a turbine disk rim may sometimes be referred to as a turbine disk rim seal. Such a turbine disk rim seal may be configured to inhibit hot gas ingestion into the disk rim area. Additionally, or in the alternative, a seal assembly may be located between adjacent turbine stages of the turbine section. A seal assembly located between adjacent turbine stages may be sometimes referred to as a turbine interstage seal. Such a turbine interstage seal may be configured to limit air recirculation within the turbine section.

A seal assembly at any one or more of these locations or other location of an engine 100 may be configured in accordance with the present disclosure. Additionally, or in the alternative, the engine 100 may include a presently disclosed seal assembly at one or more other locations of the engine 100. It will also be appreciated that the presently disclosed seal assemblies may also be used in other rotary machines, and that the engine 100 described with reference to FIG. 1 is provided by way of example only and not to be limiting.

Figure 2A:
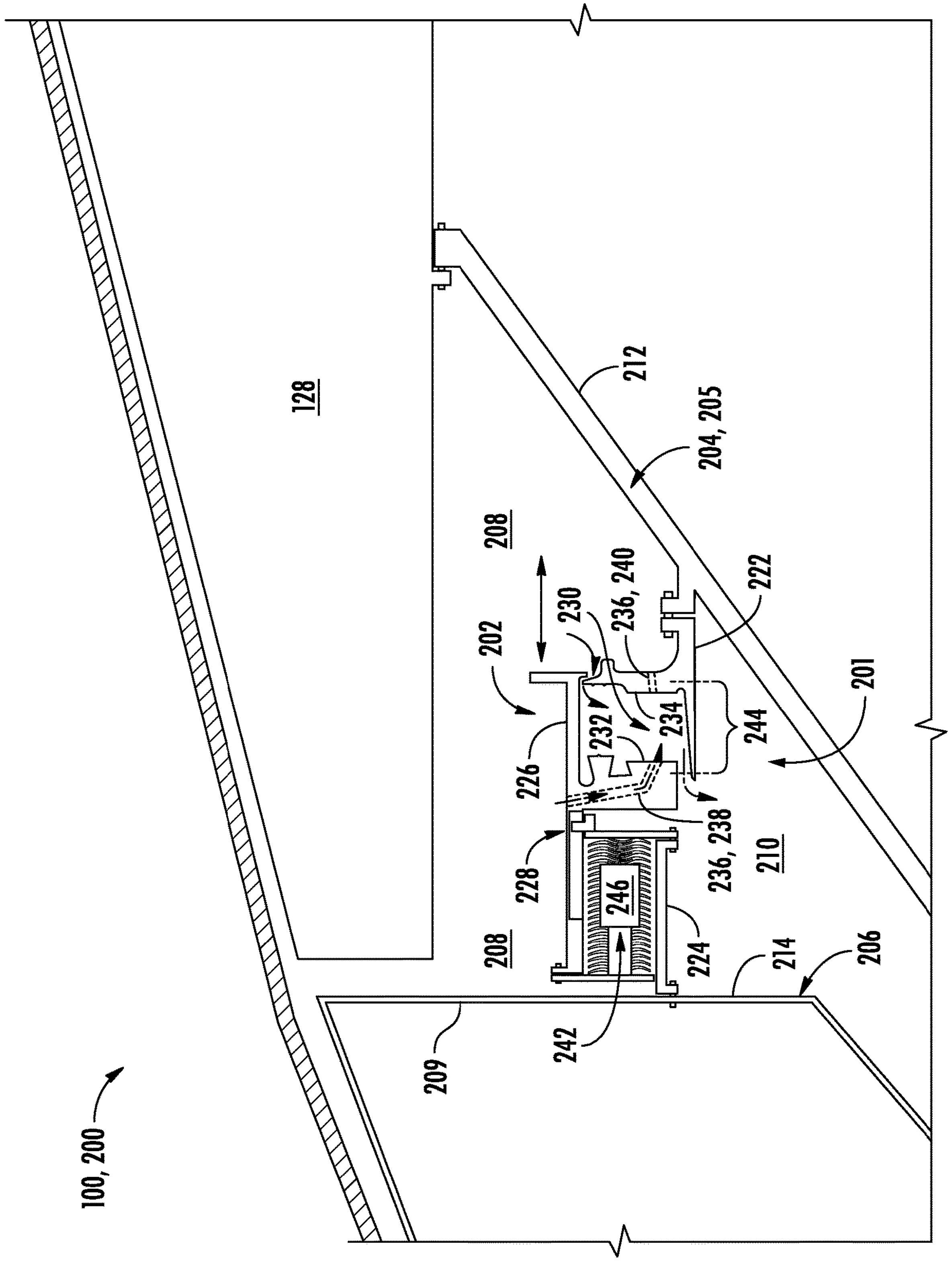
FIG. 2A illustrates a schematic perspective view of an exemplary seal assembly disposed adjacent to a rotor of a turbine engine according to embodiments of the present disclosure.
Figure 2B:
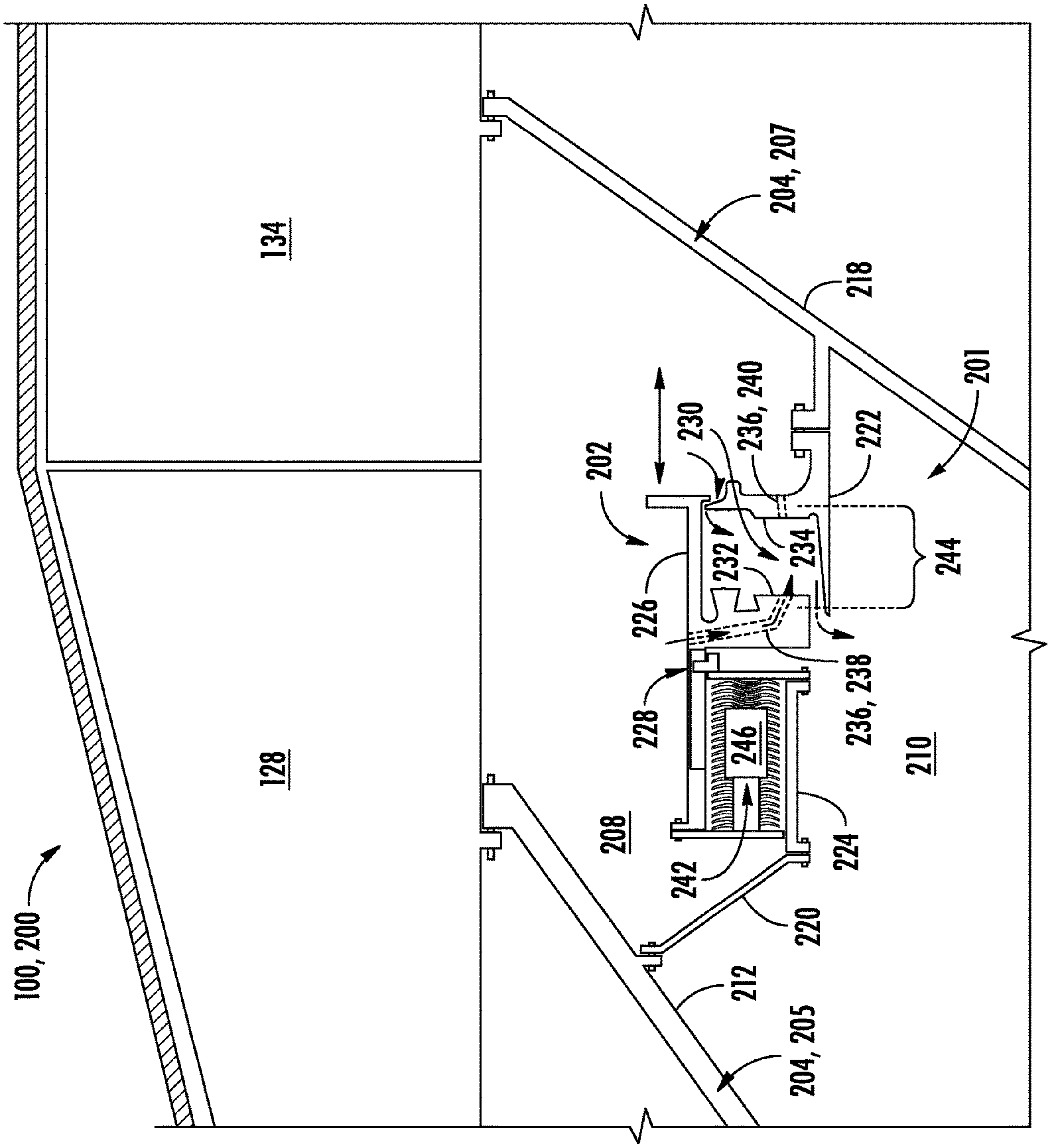
FIG. 2B illustrates a schematic perspective view of another exemplary seal assembly disposed adjacent to a rotor of a turbine engine according to embodiments of the present disclosure.

Now referring to FIGS. 2A-2B, exemplary seal assemblies are further described. As shown, a rotary machine 200, such as an engine 100, may include a seal assembly 202 configured to provide a seal interface with a rotor 204, such as between a rotor 204 and a stator 206 of a rotary machine 200. The seal assembly 202 may be integrated into any rotary machine 200, such as an engine 100 as described with reference to FIG. 1. As shown in FIG. 2A, the seal assembly 202 may separate an inlet plenum 208 from an outlet plenum 210. The inlet plenum 208 may define a region of the rotary machine 200 that includes a relatively higher-pressure fluid volume. The outlet plenum 210 may define a region of the rotary machine 200 that includes a relatively lower-pressure fluid volume. The seal assembly 202 may have an annular configuration. In some embodiments, the seal assembly 202 may include a plurality of annular elements that may be assembled to provide the seal assembly 202. Additionally, or in the alternative, the seal assembly 202 may include a plurality of semi-annular elements that may be assembled to provide the seal assembly 202 that has an annular configuration.

In some embodiments, as shown, for example, in FIG. 2A, a seal assembly 202 may provide a seal interface between a HP spool 205 and a stationary portion 209 of the core engine 104. For example, the rotor 204 may include a portion of an HP spool 205. Additionally, or in the alternative, the rotor 204 may include an HP spool cone 212 that defines a portion of the HP spool 205. In some embodiments, the stator 206 may include a turbine center frame 214. The seal assembly 202 may provide a seal interface between the HP spool cone 212 and the turbine center frame 214. Additionally, or in the alternative, in some embodiments, as shown, for example, in FIG. 2B, a seal assembly 202 may provide a seal interface between rotating bodies, such as between an HP spool 205 and a LP spool 207. The rotor 204 may include a portion of the LP spool 207. For example, as shown in FIG. 2B, the rotor 204 may include an LP spool cone 218 that defines a portion of the LP spool 207.

Additionally, or in the alternative, the seal assembly 202 may be coupled to the HP spool cone 212. For example, a seal stator 224 may be coupled to the HP spool 205, such as to the HP spool cone 212. A seal rotor 222 may be coupled to the LP spool 207, such as to the LP spool cone 218. The seal assembly 202 may define a seal interface between the HP spool cone 212 and the LP spool cone 218. In some embodiments, as shown in FIG. 2B, an inner extension 220 may couple the seal assembly 202 to the HP spool cone 212.

The seal assembly 202 may be configured as an aspirating seal that provides a non-contacting seal interface that inhibits contact between the seal stator 224 and a seal slider 226. By way of example, the seal assembly 202 may include or may be configured as an aspirating face seal, a fluid bearing, a gas bearing, or the like. During operation, a fluid within the inlet plenum 208 may flow, e.g., aspirate, through one or more pathways of the seal assembly 202 to the outlet plenum 210. In some embodiments, the fluid may include pressurized air, gasses, and/or vapor. In other embodiments, the fluid may include a liquid.

As shown, a seal assembly 202 may be disposed adjacent to the rotor 204. Further, as shown, the seal assembly 202 may include the seal rotor 222, the seal stator 224, and the seal slider 226. The seal rotor 222 may be coupled to the rotor 204, such as to an HP spool cone 212 or another portion of an HP spool 205, or such as to an LP spool cone 218 or other portion of the LP spool 207. In some embodiments, the seal stator 224 may be coupled to a stationary portion of the core engine 104, such as to a turbine center frame 214. In some embodiments, the seal stator 224 may be coupled to a rotating portion of the core engine 104, such as to the HP spool cone 212 or other portion of an HP spool 205, or such as to an LP spool cone 218 or other portion of the LP spool 207. Additionally, or in the alternative, the seal stator 224 may be coupled to an inner extension 220, as shown, for example, in FIG. 2B. The seal slider 226 may be slidably coupled to the seal stator 224 at a slide interface 228. The seal rotor 222, the seal stator 224, and/or the seal slider 226 may respectively have an annular configuration. Additionally, or in the alternative, the seal rotor 222, the seal stator 224, and/or the seal slider 226 may respectively include a plurality of semi-annular elements that may be assembled to provide an annular assembly. The seal assembly 202 may include a primary seal 230. The primary seal 230 may include or may be configured as an aspirating face seal, a fluid bearing, a gas bearing, or the like. The primary seal 230 may have an annular configuration defined by one or more annular or semi-annular components, such as the seal slider 226 and/or the seal rotor 222.

The seal slider 226 may include a slider face 232. The seal rotor 222 may include a rotor face 234. The primary seal 230 may be defined at least in part by the slider face 232 of the seal slider 226 and the rotor face 234 of the seal rotor 222. The slider face 232 and the rotor face 234 may provide a non-contacting interface that defines the aspirating face seal, fluid bearing, gas bearing, or the like, of the primary seal 230. The seal slider 226 may be configured to slidably engage and retract the slider face 232 with respect to the rotor face 234. In some embodiments, the seal assembly 202 may include a plurality of aspiration conduits 236 configured to supply fluid from the inlet plenum 208 to the primary seal 230. The plurality of aspiration conduits 236 may be defined by a monolithic structure of one or more components of the seal assembly 202.

In some embodiments, the seal slider 226 may include the plurality of aspiration conduits 236 configured to supply fluid from the inlet plenum 208 to the primary seal 230. The aspiration conduits 236 defined by the seal slider 226 may sometimes be referred to as slider-aspiration conduits 238. The slider-aspiration conduits 238 may define an internal conduit, pathway, or the like that passes through the seal slider 226. The slider-aspiration conduits 238 may fluidly communicate with the inlet plenum 208 and the primary seal 230. The slider-aspiration conduits 238 may discharge fluid from the inlet plenum 208 to the primary seal 230, for example, at a plurality of openings in the slider face 232.

Additionally, or in the alternative, the aspiration conduits 236 defined by the seal rotor 222 may sometimes be referred to as rotor-aspiration conduits 240. The rotor-aspiration conduits 240 may define an internal conduit, pathway, or the like that passes through the seal rotor 222. The rotor-aspiration conduits 240 may fluidly communicate with the inlet plenum 208 and the primary seal 230. The rotor-aspiration conduits 240 may discharge fluid from the inlet plenum 208 to the primary seal 230, for example, at a plurality of openings in the rotor face 234.

During operation, the seal slider 226 may slide forward and aft relative to the seal stator 224 and the seal rotor 222. Movement of the seal slider 226 may be initiated at least in part due to a pressure difference between the inlet plenum 208 and the outlet plenum 210. By way of example, FIGS. 2A and 2B show the seal slider 226 in a retracted position such that the primary seal 230 is relatively open. The seal slider 226 may occupy a retracted position, for example, when the rotary machine 200 operates at idle. As the power output and/or rotational speed increases, the seal slider 226 may slide forward towards the seal rotor 222, for example, as the pressure differential increases between the inlet plenum 208 and the outlet plenum 210. The seal slider 226 may occupy an engaged position, for example, when the rotary machine 200 operates at nominal operating conditions and/or at rated operating conditions. With the seal slider 226 is in an engaged position, the slider face 232 and the rotor face 234 come into close proximity, while fluid flow from the inlet plenum 208 to the outlet plenum 210, such as through the plurality of aspiration conduits 236 may define an aspirating face seal, a fluid bearing, a gas bearing, or the like, that provides a non-contacting interface between the slider face 232 and the rotor face 234.

The seal assembly 202 may include a secondary seal 242. The secondary seal 242 may have an annular configuration defined by one or more annular or semi-annular components. The secondary seal 242 may exhibit elasticity while compressing and rebounding, and/or while expanding and rebounding, over at least a portion of a range of motion of the seal slider 226. The secondary seal 242 may inhibit or prevent fluid from passing therethrough, such as from the inlet plenum 208 to the outlet plenum 210, for example, while allowing the seal slider 226 to slide forward and aft relative to the seal stator 224 and the seal rotor 222, such as between a retracted position and an engaged position, in accordance with operating conditions of the rotary machine 200.

In some embodiments, the secondary seal 242 may be configured to provide resistance to a compression load. At least a portion of the compression load upon the secondary seal 242 may be activated when the seal slider 226 moves forward towards the seal rotor 222. Additionally, or in the alternative, the secondary seal 242 may exhibit at least some preload, such as at least some compression preload. The secondary seal 242 may be configured to exhibit a force constant, such as under a compression load, configured at least in part to provide resistance to the compression load while exhibiting forward and/or aft displacement suitable for operation of the primary seal 230, such as under specified operating conditions of the rotary machine 200.

In some embodiments, in addition or in the alternative to a compression load, the secondary seal 242 may be configured to provide resistance to a tension load. At least a portion of the tension load upon the secondary seal 242 may be activated when the seal slider 226 moves forward towards the seal rotor 222. Additionally, or in the alternative, the secondary seal 242 may exhibit at least some preload, such as at least some tension preload. The secondary seal 242 may be configured to exhibit a force constant, such as under a tension load, configured at least in part to provide resistance to the tension load while exhibiting forward and/or aft displacement suitable for operation of the primary seal 230, such as under specified operating conditions of the rotary machine 200. The forward and aft displacement of the secondary seal 242 may include compression and/or expansion of one or more secondary sealing elements 246 of the secondary seal 242. The specified operating conditions of the rotary machine 200 may include, for example, at least one of: startup operating conditions, idle operating conditions, shutdown operating conditions, nominal operating conditions, transient operating conditions, and aberrant operating conditions. A force vector, such as a compression force vector, acting on the secondary seal 242 may impart a compression load sufficient to move the seal slider 226 towards the seal rotor 222 and/or to hold the seal slider 226 in a position, such as an engaged position, relative to the seal rotor 222.

Additionally, or in the alternative, a force vector, such as a tension force vector, acting on the secondary seal 242 may impart a tension load sufficient to move the seal slider 226 towards the seal rotor 222 and/or to hold the seal slider 226 in a position, such as an engaged position, relative to the seal rotor 222. The force vector may include at least a pressure difference between the inlet plenum 208 and the outlet plenum 210. The force vector acting on the secondary seal 242 may cause the seal slider 226 to occupy and/or maintain an engaged position relative to the seal rotor 222 such that the slider face 232 has a suitable distance from the rotor face 234 to provide an aspirating face seal, a fluid bearing, a gas bearing, or the like.

In some embodiments, resistance to a compression load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the compression load, retracting the seal slider 226 and/or holding the seal slider 226 in a retracted position. Additionally, or in the alternative, resistance to a tension load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the tension load, retracting the seal slider 226 and/or holding the seal slider 226 in a retracted position. The force constant of the secondary seal 242 may overcome the compression force vector and/or the tension force vector acting upon the secondary seal 242, causing the seal slider 226 to occupy and/or maintain a retracted position relative to the seal rotor 222, for example, when the pressure difference between the inlet plenum 208 and the outlet plenum is below, or decreases below, a threshold value. The secondary seal 242 may retract and/or hold the seal slider 226 in a retracted position relative to the seal rotor 222 under specified operating conditions of the rotary machine 200, including, for example, at least one of: startup operating conditions, idle operating conditions, shutdown operating conditions, transient operating conditions, and aberrant operating conditions. In some embodiments, with the seal slider 226 occupying a retracted position relative to the seal rotor 222, the slider face 232 of the primary seal 230 may be sufficiently separated from the rotor face 234 of the seal rotor 222 to provide disengage the aspirating face seal, fluid bearing, gas bearing, or the like.

In some embodiments, the seal rotor 222 may move forward and aft relative to the seal slider 226 and/or the seal stator 224. The seal slider 226 may be configured to move forward and aft responsive to movement of the seal rotor 222. For example, forward and aft movements of the seal slider 226 may track forward and aft movements of the seal rotor 222. In some embodiments, a force vector acting upon the secondary seal 242 may include at least a force imparted by the seal rotor 222. Additionally, or in the alternative, the seal stator 224 may move forward and aft relative to the seal slider 226 and/or the seal rotor 222. The seal slider 226 may be configured to move forward and aft responsive to movement of the seal stator 224. For example, forward and aft movements of the seal slider 226 may track forward and aft movements of the seal stator 224. In some embodiments, a force vector acting upon the secondary seal 242 may include at least a force imparted by the seal stator 224.

During operation, the secondary seal 242 may move through various stages of compression and rebound, and/or tension and rebound, for example, responsive to variations in one or more force vectors acting upon the secondary seal 242. The variations in the one or more force vectors may include at least one of: variations in a pressure difference between the inlet plenum 208 and the outlet plenum 210, movements of the seal rotor 222, and movements of the seal stator 224. The secondary seal 242 may exhibit responsiveness to such variations in the one or more force vectors sufficient to maintain the seal slider 226 in an engaged position during specified operating conditions such that the slider face 232 may maintain a suitable distance from the rotor face 234 to provide an aspirating face seal, a fluid bearing, a gas bearing, or the like. For example, the secondary seal 242 may maintain the seal slider 226 in an engaged position during variable operating conditions that fall within a working range of variation. Additionally, or in the alternative, the secondary seal 242 may retract the seal slider to a retracted position, and/or may maintain the seal slider 226 in a retracted position, during operating conditions that fall outside of the working range of variation. Operating conditions may be within the working range of variation during at least one of: startup operating conditions, idle operating conditions, shutdown operating conditions, transient operating conditions, and aberrant operating conditions. Operating conditions may fall outside of the working range of variation during at least one of: startup operating conditions, idle operating conditions, shutdown operating conditions, transient operating conditions, and aberrant operating conditions.

Exemplary seal assemblies 202 may include the primary seal 230 that has one or more primary sealing elements 244. Additionally, or in the alternative, exemplary seal assemblies 202 may include the secondary seal 242 that has one or more secondary sealing elements 246. The secondary sealing element(s) 246 may be coupled to the seal stator 224 and/or to the seal slider 226. In some embodiments, a rotor-facing portion of the secondary sealing element 246 may be coupled to the seal stator 224.

Additionally, or in the alternative, a stator-facing portion of the secondary sealing element 246 may be coupled to the seal slider 226. In some embodiments, a stator-facing portion of the secondary sealing element 246 may be coupled to the seal stator 224. Additionally, or in the alternative, a rotor-facing portion of the secondary sealing element 246 may be coupled to the seal slider 226. The one or more primary sealing elements 244 and/or the one or more secondary sealing elements 246 may be engaged and/or disengaged depending at least in part on a position of the seal slider 226 relative to the seal rotor 222 and/or the seal stator 224. During operation, engagement and/or disengagement of the one or more primary sealing elements 244 and/or the one or more secondary sealing elements 246 may depend at least in part on one or more forces acting upon the secondary seal 242. Additionally, or in the alternative, in some embodiments, exemplary seal assemblies 202 may include a tertiary seal that has one or more tertiary sealing elements. The one or more tertiary sealing elements may be engaged and/or disengaged depending at least in part on a position of the seal slider 226 relative to the seal rotor 222 and/or the seal stator 224, for example, responsive to on one or more forces acting upon the secondary seal 242.

Figure 3:
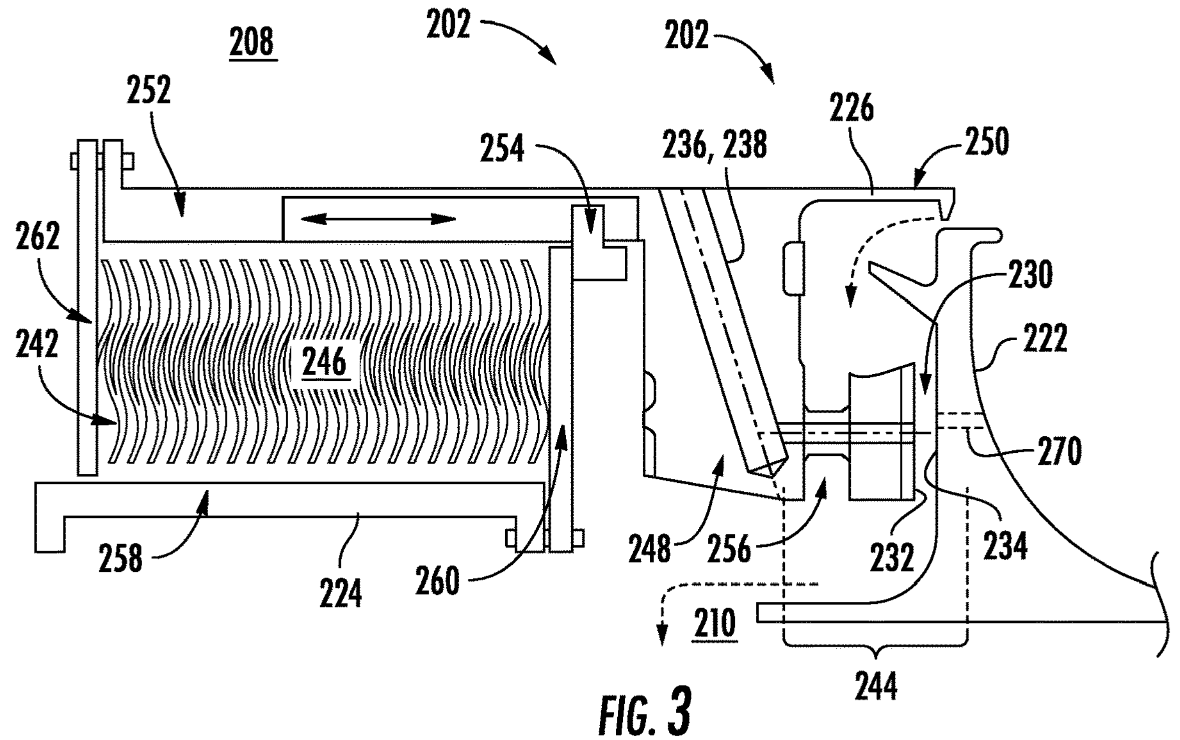
FIG. 3 shows a schematic side view of an exemplary seal assembly according to embodiments of the present disclosure.

Referring now to FIG. 3, the seal slider 226 may include a primary seal body 248. The primary seal body 248 may include one or more slider faces 232. The one or more slider faces 232 may respectively interface with a one or more corresponding rotor faces 234, define a primary seal 230 and/or a one or more corresponding primary sealing elements 244. In some embodiments, the primary seal body 248 may define a plurality of slider-aspiration conduits 238. The seal slider 226 may include a rotor-facing extension 250 that projects axially towards the seal rotor 222. The rotor-facing extension 250 may axially overlap at last a portion of the seal rotor 222 over at least a portion of the range of motion of the seal slider 226. The rotor-facing extension 250 and the primary seal body 248 may define respective portions of a single component, such as a monolithic component, or the rotor-facing extension 250 and the primary seal body 248 may be coupled to one another. The seal slider 226 may include a stator-facing extension 252 that projects axially towards the seal stator 224. The stator-facing extension 252 may axially overlap the seal stator 224 over at least a portion of the range of motion of the seal slider 226. The stator-facing extension 252 and the primary seal body 248 may define respective portions of a single component, such as a monolithic component, or the stator-facing extension 252 and the primary seal body 248 may be coupled to one another. In some embodiments, the seal stator 224 may be coupled to the seal slider 226 directly or indirectly at the stator-facing extension 252. Additionally, or in the alternative, the seal stator 224 may be coupled to the seal slider 226 directly or indirectly at the primary seal body 248. In some embodiments, the secondary seal 242 may be directly or indirectly coupled to the seal slider 226. For example, the secondary seal 242 may be coupled to the seal slider 226 directly or indirectly at the stator-facing extension 252 and/or directly or indirectly at the primary seal body 248. Additionally, or in the alternative, in some embodiments, the secondary seal 242 may be directly or indirectly coupled to the seal stator 224.

In some embodiments, the seal stator 224 may include a stator flange 258 and a slider flange 260. The stator flange 258 may be coupled to or defined by the stator 206 of the rotary machine 200, such as a turbine center frame 214 (FIG. 2A). Additionally, or in the alternative, the stator flange 258 may be coupled to or defined by the rotor 204 of the rotary machine 200, such as to the HP spool cone 212 and/or an inner extension 220 (FIG. 2B). The slider flange 260 may be configured to interface with the seal slider 226. One or more slider pins 254 may be defined by or coupled to the slider flange 260. The slider flange 260 may be coupled to the stator flange 258, or the slider flange 260 and the stator flange 258 may define respective portions of a single component, such as a monolithic component.

In some embodiments, the seal slider 226 may include a secondary seal flange 262. The secondary seal flange 262 may be coupled to the seal slider 226, such as to the stator-facing extension 252 of the seal slider 226. Alternatively, the secondary seal flange 262 may define a portion of the seal slider 226, such as a portion of the stator-facing extension 252. For example, the seal slider 226 and the secondary seal flange 262 may define respective portions of a single component, such as a monolithic component.

As shown, for example, in FIG. 3, the secondary seal 242 may be disposed between the seal stator 224 and the seal slider 226. In some embodiments, the secondary seal 242 may be coupled to the seal stator 224. For example, the secondary seal 242, such as a rotor-facing portion of the secondary seal 242, may be coupled to the slider flange 260 of the seal stator 224. Additionally, or in the alternative, the secondary seal 242 may be coupled to the seal slider 226. For example, the secondary seal 242, such as a stator-facing portion of the secondary seal 242, may be coupled to the secondary seal flange 262 of the seal slider 226. As described herein, the secondary seal 242 may be configured to exhibit forward and aft displacement and/or compression and rebound, such as under a compression load and/or a tension load, suitable for operation of the primary seal 230, such as under specified operating conditions of the rotary machine 200. The secondary seal 242 and/or one or more secondary sealing elements 246 thereof may be configured to inhibit or prevent fluid flow through the secondary seal 242, such as from the inlet plenum 208 to the outlet plenum 210.

In some embodiments, the secondary seal 242 and/or one or more secondary sealing elements 246 thereof may be impermeable to fluid. Additionally, or in the alternative, the secondary seal 242 and/or one or more secondary sealing elements 246 thereof may provide a fluid-tight seal, for example, at an interface with a portion of the seal slider 226, such as the secondary seal flange 262, and/or at an interface with a portion of the seal stator 224, such as the slider flange 260. For example, the secondary seal 242 and/or the secondary sealing element(s) 246 may be coupled to the seal slider 226, such as to the secondary seal flange 262, for example, at a stator-facing portion of the secondary seal 242 and/or the one or more secondary sealing elements 246. Additionally, or in the alternative, the secondary seal 242 and/or the secondary sealing element(s) 246 may be coupled to the seal stator 224, such as to the slider flange 260, for example, at a rotor-facing portion of the secondary seal 242 and/or the secondary sealing element(s) 246. The secondary seal 242 and/or the secondary sealing element(s) 246 may be coupled to the seal stator 224 and/or to the seal slider 226 by way of welding, brazing, attachment hardware, or the like. Additionally, or in the alternative, the secondary seal 242 and/or the secondary sealing element(s) 246 may be seated in groove or the like defined by the seal slider 226 (such as by the secondary seal flange 262) that provides a fluid-tight seal therebetween. Additionally, or in the alternative, the secondary seal 242 and/or the secondary sealing element(s) 246 may be seated in groove or the like defined by the seal stator 224 (such as by the slider flange 260) that provides a fluid-tight seal therebetween. In some embodiments, the secondary seal 242 and/or secondary sealing element(s) 246 thereof may be permeable to fluid, while suitably inhibiting fluid flow therethrough, such as from the inlet plenum 208 to the outlet plenum 210.

Referring now to FIGS. 3-7, the seal assembly 202 further includes a flexible joint 256 connected between the slider face 232 and the primary seal body 248 of the seal slider 226. In such embodiments, the flexible joint 256 is configured to locally decouple movement of the slider face 232 from the seal slider 226 to allow the slider face 232 to track movement of the rotor 204 apart from the primary seal body 248.

Figure 4:
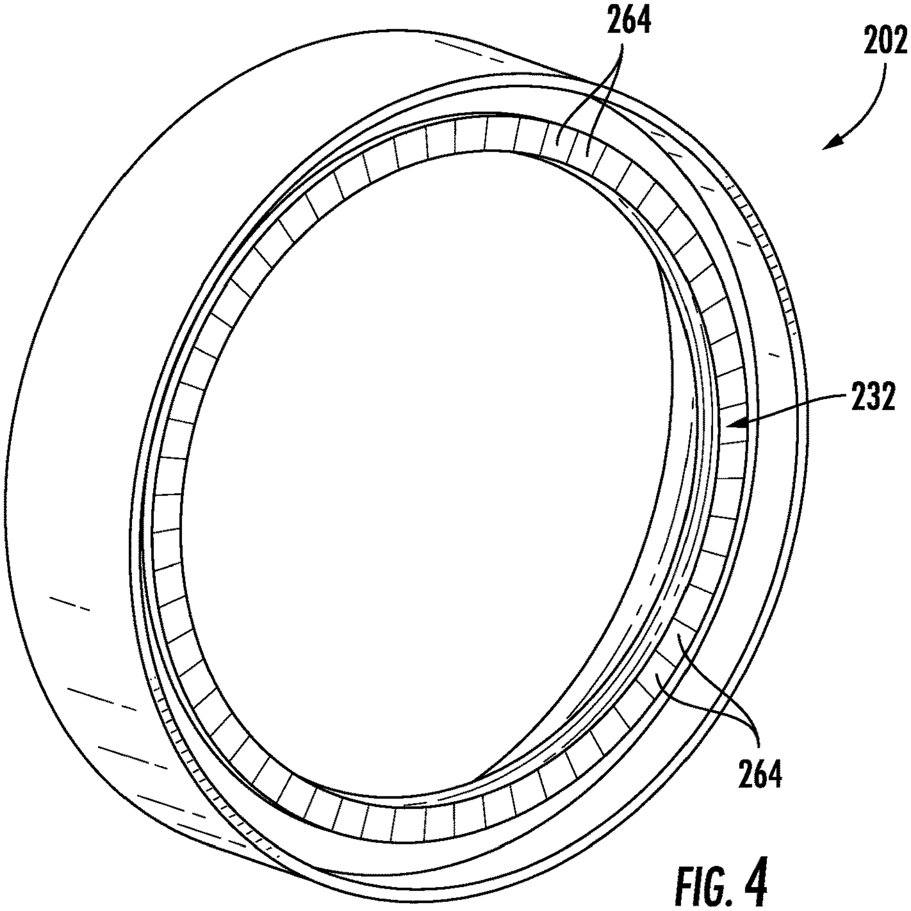
FIG. 4 is a perspective view of an embodiment of a seal assembly having an aspirating face seal according to the present disclosure.
Figure 5:
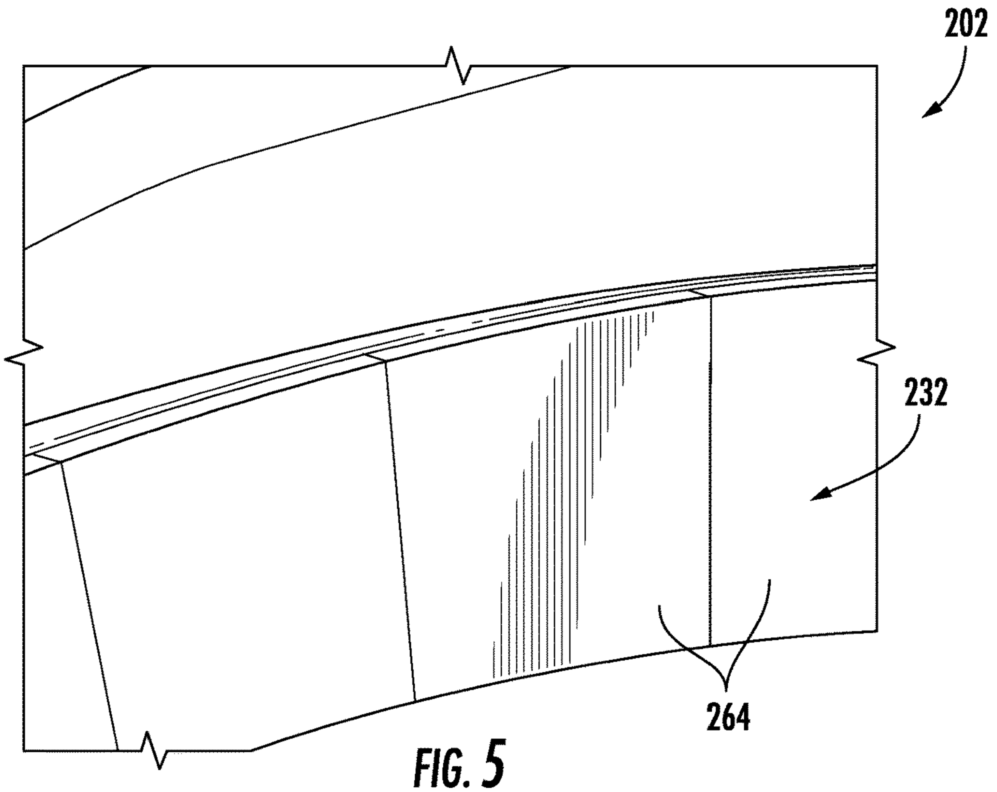
FIG. 5 is a partial front view of the aspirating face seal illustrated in FIG. 4.

More specifically, FIG. 4 illustrates a perspective view of an embodiment of the seal assembly 202 with the slider face 232 segmented into a plurality of segments 264. Moreover, as shown, the segments 264 of the slider face 232 are arranged adjacent to each other in a ring-shaped configuration.

Figure 6:
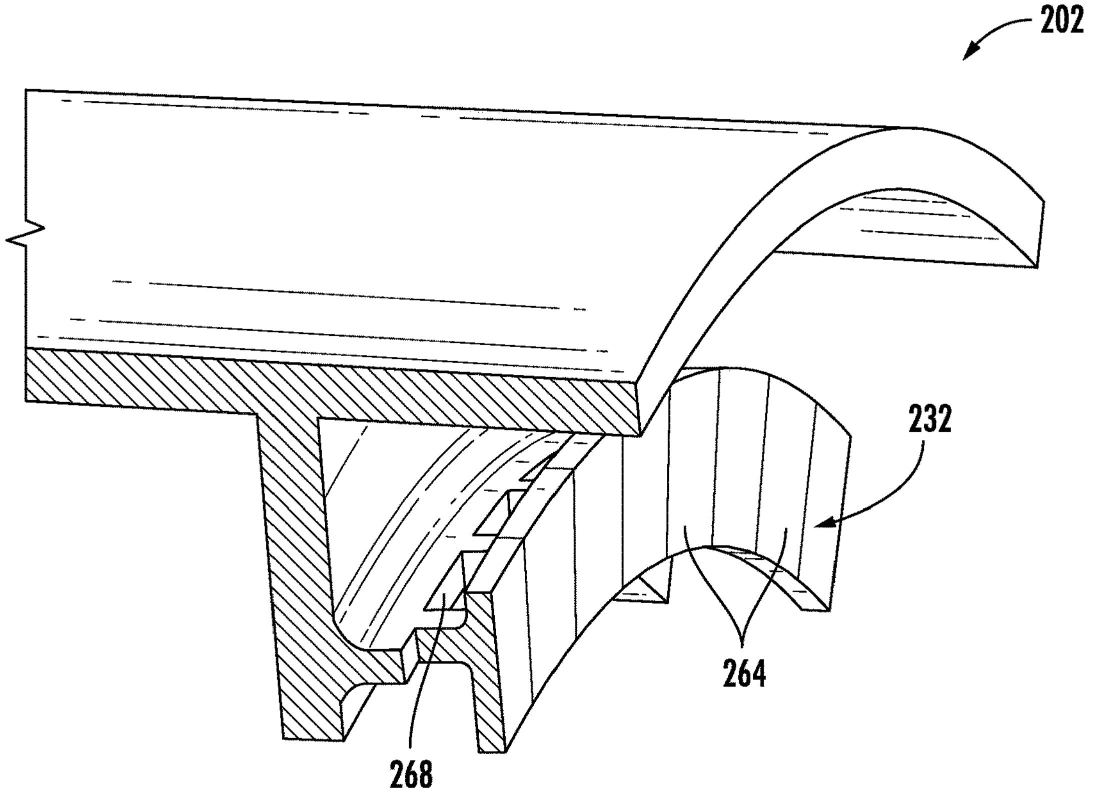
FIG. 6 is a partial perspective view of an embodiment of a seal assembly having an aspirating face seal with a flexible joint according to the present disclosure.
Figure 7:
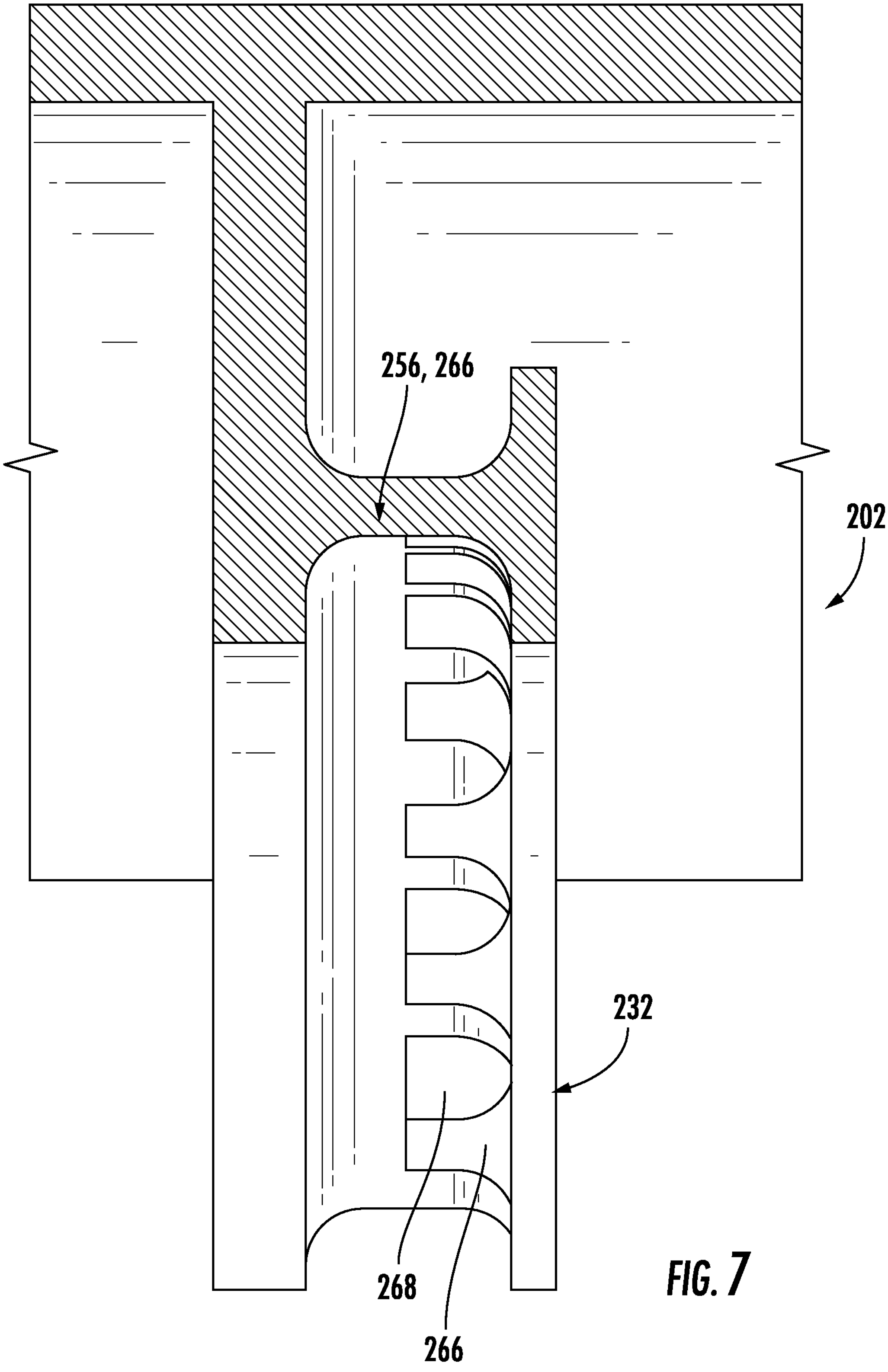
FIG. 7 is a partial cross-sectional view of an embodiment of a seal assembly having a flexible joint according to the present disclosure.

Furthermore, and referring particularly to FIGS. 6 and 7, the flexible joint 256 includes a plurality of flexible pivots 266 connected between the slider face 232 and the primary seal body 248 of the seal slider 226. For example, in an embodiment, one or more of the plurality of segments 264 includes at least one of the flexible pivots 266, e.g., for providing wavy and coning deformation flexibility. In other embodiment, one or more of the plurality of segments 264 may include at least two flexible pivots 266, e.g., for providing coning flexibility. In particular embodiments, the flexible pivots 266 may be constructed using any suitable means, such as via additive manufacturing (e.g., wire-EDM, machining, etc.).

Moreover, as shown in FIGS. 6 and 7, adjacent flexible pivots 266 may be spaced apart from each other to create one or more vent ports 268 in the flexible joint 256. Thus, in the illustrated embodiment, the seal assembly 202 includes a plurality of vent ports 268 formed by the plurality of flexible pivots 266. Accordingly, in such embodiments, the flexible pivots allow for venting as well as pass-through ports for pressurizing the seal assembly 202. In additional embodiments, as shown in FIG. 3, the seal assembly 202 may also or optionally include one or more feed ports 270 on the rotor 204. In such embodiments, the feed port(s) 270 may be used in conjunction with or in place of the vent ports 268.

Further aspects of the presently disclosed subject matter are provided by the following clauses:

A rotary machine, comprising: a stator; a rotor configured to rotate with respect to the stator, the rotor being arranged with the stator at a rotor-stator interface; a seal assembly at the rotor-stator interface, the seal assembly comprising a seal rotor, a seal stator, a seal slider, and a seal defined by a rotor face of the seal rotor and a slider face of the seal slider; and a flexible joint connected between the slider face and a primary seal body of the seal slider. The flexible joint is configured to locally decouple movement of the slider face from the seal slider to allow the slider face to track movement of the rotor apart from the primary seal body.

The rotary machine of any preceding clause, wherein the slider face is segmented into a plurality of segments.

The rotary machine of any preceding clause, wherein the plurality of segments are arranged adjacent to each other in a ring-shaped configuration.

The rotary machine of any preceding clause, further comprising one or more vent ports in the flexible joint.

The rotary machine of any preceding clause, wherein the flexible joint comprises a plurality of flexible pivots spaced circumferentially between the slider face and the primary seal body of the seal slider.

The rotary machine of any preceding clause, further comprising a plurality of vent ports formed by the plurality of flexible pivots.

The rotary machine of any preceding clause, wherein one or more of the plurality of segments comprises at least one flexible pivot of the plurality of flexible pivots.

The rotary machine of any preceding clause, wherein one or more of the plurality of segments comprises at least two flexible pivots of the plurality of flexible pivots.

The rotary machine of any preceding clause, further comprising one or more feed ports on the rotor.

The rotary machine of any preceding clause, wherein the seal of the seal assembly is configured as at least one of an aspirating face seal, a fluid bearing, or a gas bearing, the seal defining an air bearing surface on the rotor at the rotor-stator interface.

The rotary machine of any preceding clause, wherein the rotary machine comprises a gas turbine engine.

A gas turbine engine, comprising: a stator; a rotor configured to rotate with respect to the stator, the rotor being arranged with the stator at a rotor-stator interface; a seal assembly at the rotor-stator interface, the seal assembly comprising a seal rotor, a seal stator, a seal slider, and an aspirating face seal defined by a rotor face of the seal rotor and a slider face of the seal slider; and a flexible joint connected between the slider face and a primary seal body of the seal slider. The flexible joint is configured to locally decouple movement of the slider face from the seal slider to allow the slider face to track movement of the rotor apart from the primary seal body.

The gas turbine engine of any preceding clause, wherein the slider face is segmented into a plurality of segments.

The gas turbine engine of any preceding clause, wherein the plurality of segments are arranged adjacent to each other in a ring-shaped configuration.

The gas turbine engine of any preceding clause, further comprising one or more vent ports in the flexible joint.

The gas turbine engine of any preceding clause, wherein the flexible joint comprises a plurality of flexible pivots spaced circumferentially between the slider face and the primary seal body of the seal slider.

The gas turbine engine of any preceding clause, further comprising a plurality of vent ports formed by the plurality of flexible pivots.

The gas turbine engine of any preceding clause, wherein one or more of the plurality of segments comprises at least one flexible pivot of the plurality of flexible pivots.

The gas turbine engine of any preceding clause, wherein one or more of the plurality of segments comprises at least two flexible pivots of the plurality of flexible pivots.

The gas turbine engine of any preceding clause, further comprising one or more feed ports on the rotor.

A seal assembly having a seal rotor, a seal stator, a seal slider, and a seal defined by a rotor face of the seal rotor and a slider face of the seal slider; and a flexible joint connected between the slider face and a primary seal body of the seal slider to allow the slider face to track movement of a rotor without affecting the primary seal body so as to decouple movement of the slider face from the seal slider.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A rotary machine, comprising:
- a stator;
- a rotor configured to rotate with respect to the stator, the rotor being arranged with the stator at a rotor-stator interface;
- a seal assembly at the rotor-stator interface, the seal assembly comprising a seal rotor, a seal stator, a seal slider, and a seal defined by a rotor face of the seal rotor and a slider face of the seal slider; and
- a flexible joint connected between the slider face and a primary seal body of the seal slider, the flexible joint configured to locally decouple movement of the slider face from the seal slider to allow the slider face to track movement of the rotor apart from the primary seal body.

2. The rotary machine of claim 1, wherein the slider face is segmented into a plurality of segments.

3. The rotary machine of claim 2, wherein the plurality of segments are arranged adjacent to each other in a ring-shaped configuration.

4. The rotary machine of claim 2, wherein the flexible joint comprises a plurality of flexible pivots spaced circumferentially between the slider face and the primary seal body of the seal slider.

5. The rotary machine of claim 4, further comprising a plurality of vent ports formed by the plurality of flexible pivots.

6. The rotary machine of claim 4, wherein one or more of the plurality of segments comprises at least one flexible pivot of the plurality of flexible pivots.

7. The rotary machine of claim 6, wherein one or more of the plurality of segments comprises at least two flexible pivots of the plurality of flexible pivots.

8. The rotary machine of claim 1, further comprising one or more vent ports in the flexible joint.

9. The rotary machine of claim 1, further comprising one or more feed ports on the rotor.

10. The rotary machine of claim 1, wherein the seal of the seal assembly is configured as at least one of an aspirating face seal, a fluid bearing, or a gas bearing, the seal defining an air bearing surface on the rotor at the rotor-stator interface.

11. The rotary machine of claim 1, wherein the rotary machine comprises a gas turbine engine.

12. A gas turbine engine, comprising:

a stator;

a rotor configured to rotate with respect to the stator, the rotor being arranged with the stator at a rotor-stator interface and defining a rotor face;

a seal assembly at the rotor-stator interface, the seal assembly comprising a seal rotor, a seal stator, a seal slider, and an aspirating face seal defined by a rotor face of the seal rotor and a slider face of the seal slider; and a flexible joint connected between the slider face and a primary seal body of the seal slider, the flexible joint configured to locally decouple movement of the slider face from the seal slider to allow the slider face to track movement of the rotor apart from the primary seal body.

13. The gas turbine engine of claim 12, wherein the slider face is segmented into a plurality of segments.

14. The gas turbine engine of claim 13, wherein the plurality of segments are arranged adjacent to each other in a ring-shaped configuration.

15. The gas turbine engine of claim 13, wherein the flexible joint comprises a plurality of flexible pivots spaced circumferentially between the slider face and the primary seal body of the seal slider.

16. The gas turbine engine of claim 15, further comprising a plurality of vent ports formed by the plurality of flexible pivots.

17. The gas turbine engine of claim 15, wherein one or more of the plurality of segments comprises at least one flexible pivot of the plurality of flexible pivots.

18. The gas turbine engine of claim 15, wherein one or more of the plurality of segments comprises at least two flexible pivots of the plurality of flexible pivots.

19. The gas turbine engine of claim 12, further comprising one or more vent ports in the flexible joint.

20. The gas turbine engine of claim 12, further comprising one or more feed ports on the rotor.

* * * * *